(12) United States Patent
Dietrich et al.

(10) Patent No.: US 7,301,926 B1
(45) Date of Patent: Nov. 27, 2007

(54) AUTOMATIC COVERAGE HOLE DETECTION IN COMPUTER NETWORK ENVIRONMENTS

(75) Inventors: Paul F. Dietrich, Seattle, WA (US); Robert J. Friday, Los Gatos, CA (US); Robert B. O'Hara, Jr., Santa Clara, CA (US)

(73) Assignee: Airespace, Inc., San Jose, CA (US)

( * ) Notice: Subject to any disclaimer, the term of this patent is extended or adjusted under 35 U.S.C. 154(b) by 1041 days.

(21) Appl. No.: 10/407,357

(22) Filed: Apr. 4, 2003

(51) Int. Cl.
*H04Q 7/24* (2006.01)
(52) U.S. Cl. .................. 370/338; 370/332; 370/331; 370/310; 370/329; 370/330; 455/436; 455/450; 455/446
(58) Field of Classification Search ............. 370/338, 370/329, 333, 310, 330, 331, 332; 455/67.11, 455/67.13
See application file for complete search history.

(56) References Cited

U.S. PATENT DOCUMENTS

| | | | |
|---|---|---|---|
| 5,491,692 A | 2/1996 | Gunner et al. | |
| 5,684,860 A | 11/1997 | Milani et al. | |
| 5,940,384 A | 8/1999 | Carney et al. | |
| 6,097,956 A | 8/2000 | Veeravalli et al. | |
| 6,104,928 A | 8/2000 | Waugh | |
| 6,140,964 A * | 10/2000 | Sugiura et al. | 342/464 |
| 6,167,274 A * | 12/2000 | Smith | 455/456.3 |
| 6,208,629 B1 | 3/2001 | Jaszewski et al. | |
| 6,223,028 B1 | 4/2001 | Chang et al. | |
| 6,240,077 B1 | 5/2001 | Vuong et al. | |
| 6,243,413 B1 | 6/2001 | Beukema | |
| 6,286,038 B1 | 9/2001 | Reichmeyer et al. | |
| 6,338,140 B1 * | 1/2002 | Owens et al. | 713/168 |
| 6,473,038 B2 | 10/2002 | Patwari et al. | |
| 6,664,925 B1 * | 12/2003 | Moore et al. | 342/451 |
| 6,754,488 B1 * | 6/2004 | Won et al. | 455/424 |

(Continued)

OTHER PUBLICATIONS

PCT Notification of Transmittal of the International Search Report and The Written Opinion of the International Searching Authority, or the Declaration (PCT Rule 44.1), dated Sep. 18, 2006, International Application No. PCT/US2006/00078.

(Continued)

*Primary Examiner*—Marceau Milord
(74) *Attorney, Agent, or Firm*—Mark J. Spolyar

(57) ABSTRACT

Methods, apparatuses and systems enabling real-time analysis of coverage and other performance attributes of distributed or networked systems, such as wireless computer network environments. In one embodiment, the present invention utilizes information obtained from monitoring wireless communications in a wireless network system from remote client elements to access elements in relation to at least one attribute, such as signal strength and signal-to-noise ratio (SNR). Although the present invention has application to a variety of wireless network architectures, in one embodiment, the present invention is implemented in a wireless Local Area Network (WLAN) system having a hierarchical architecture comprising a central control element associated with at least one access element. The access element encapsulates data packets received from remote client elements including protocol and other information (such as attributes of the detected signal associated with the data packets), and tunnels the encapsulated data packets to the central control element. The central control element maintains and analyzes the information contained in the packets to analyze the coverage of the wireless network environment.

18 Claims, 5 Drawing Sheets

U.S. PATENT DOCUMENTS

| | | | |
|---|---|---|---|
| 6,760,318 B1 * | 7/2004 | Bims | 370/332 |
| 6,788,658 B1 | 9/2004 | Bims | |
| 6,799,047 B1 | 9/2004 | Bahl et al. | |
| 6,810,428 B1 | 10/2004 | Larsen et al. | |
| 6,917,819 B2 | 7/2005 | Collins | |
| 6,925,069 B2 | 8/2005 | Koos et al. | |
| 6,925,070 B2 * | 8/2005 | Proctor, Jr. | 370/335 |
| 6,990,428 B1 * | 1/2006 | Kaiser et al. | 702/150 |
| 7,068,644 B1 * | 6/2006 | McConnell et al. | 370/352 |
| 7,133,909 B2 * | 11/2006 | Bahl | 709/223 |
| 2002/0168958 A1 * | 11/2002 | Ford et al. | 455/404 |
| 2002/0188723 A1 | 12/2002 | Choi et al. | |
| 2002/0194384 A1 | 12/2002 | Habetha | |
| 2003/0023746 A1 | 1/2003 | Loguinov | |
| 2003/0117985 A1 * | 6/2003 | Fugii et al. | 370/338 |
| 2003/0188006 A1 | 10/2003 | Bard | |
| 2003/0198208 A1 | 10/2003 | Koos et al. | |
| 2003/0224787 A1 | 12/2003 | Gandollo | |
| 2004/0111607 A1 | 6/2004 | Yellepeddy | |
| 2004/0203910 A1 * | 10/2004 | Hind et al. | 455/456.1 |

OTHER PUBLICATIONS

International Standard, ISO/IEC 8802-11 ANS/IEEE Std. 802.11, 1999 Edition, Part II: Wirelss LAN Medium Access Control (MAC) and Physical Layer (PHY) specifications. pp. 122-137.

"Tcp-masq" Internet citation http://speed.cis.nctu.edu.tw/bandwith/opensource/, Daa Sheet Cisco Aironet 1200 Series Access Point, pp. 1-13, posted Mar. 11, 2002.

* cited by examiner

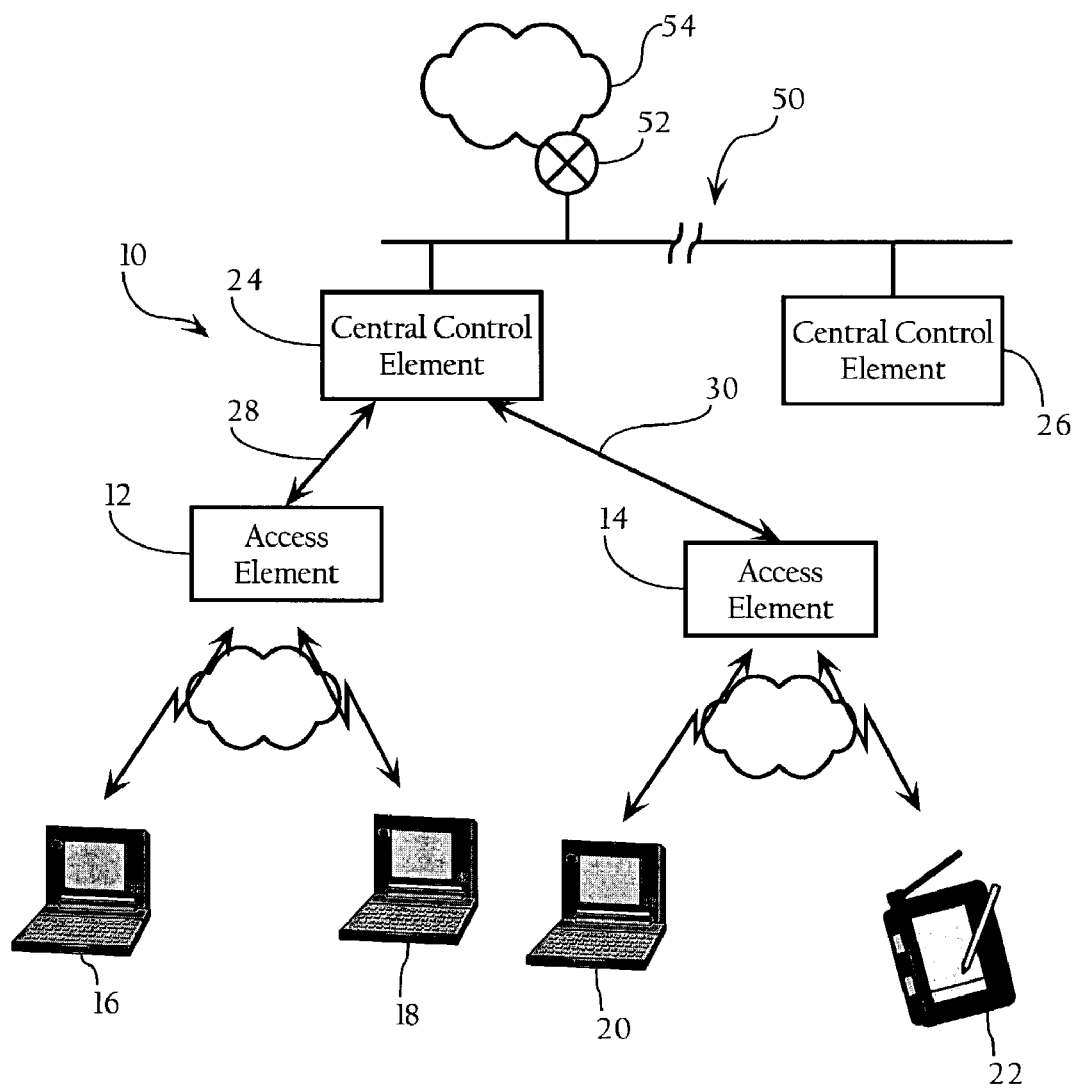
Fig._1

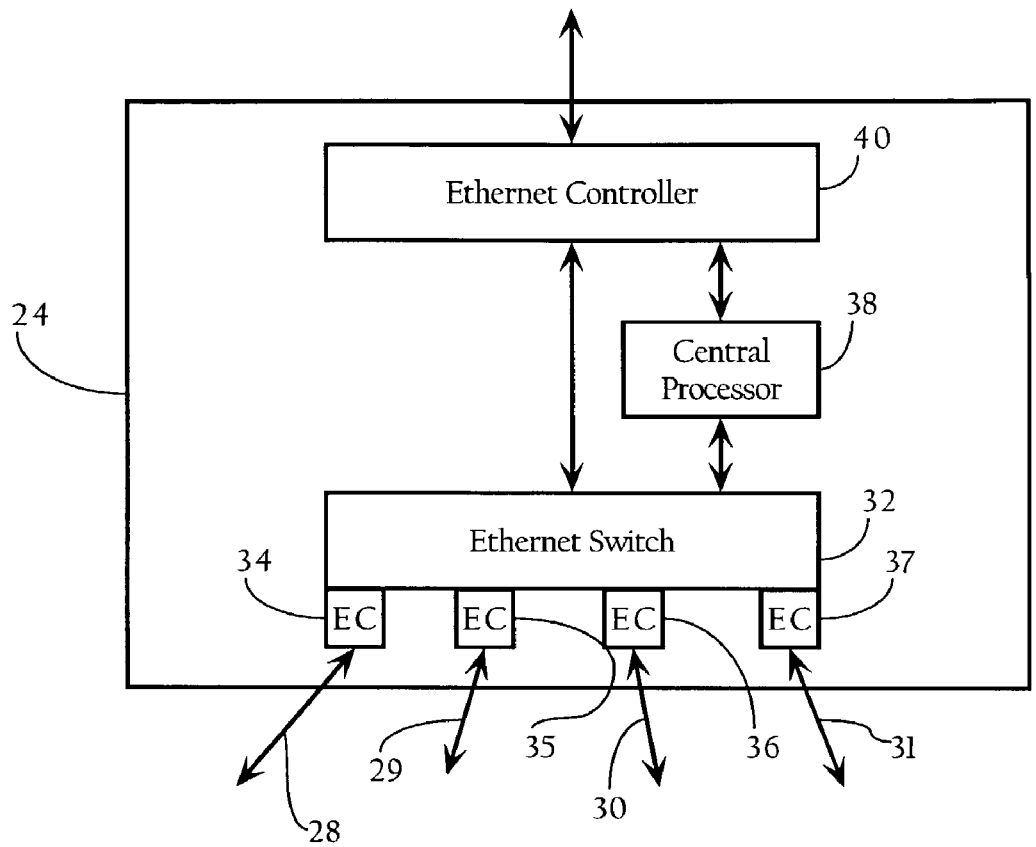
Fig._2
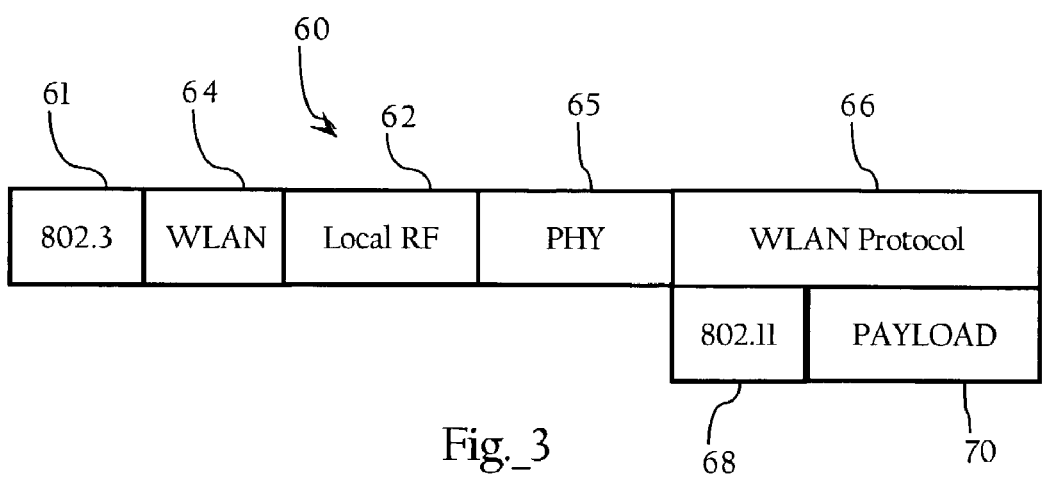
Fig._3

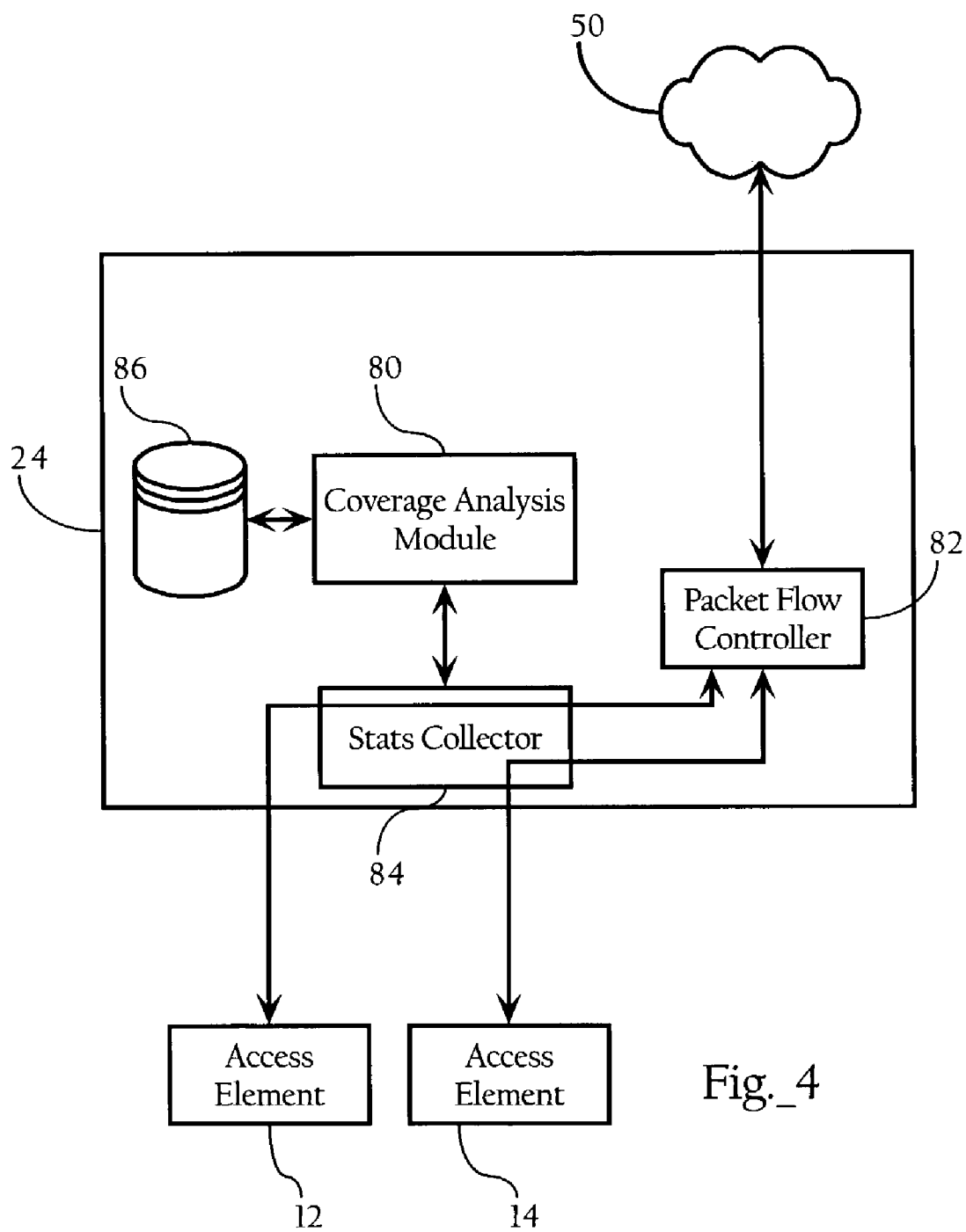
Fig._4

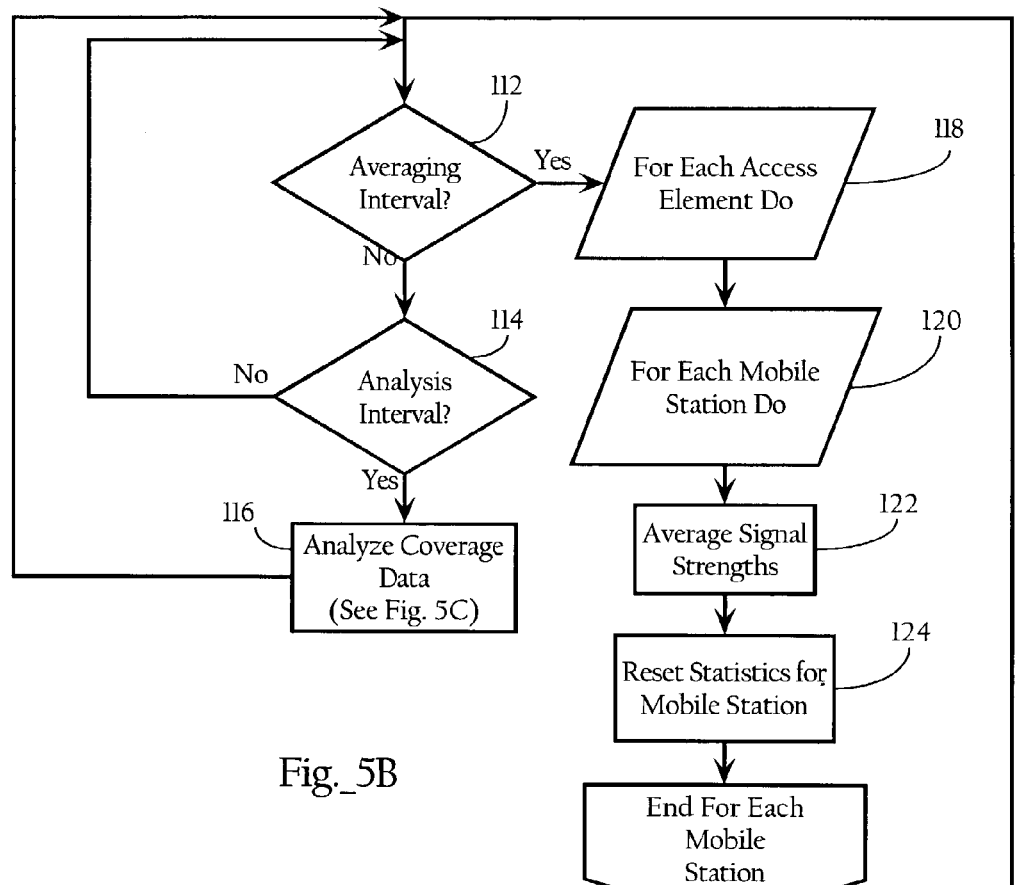
Fig._5B
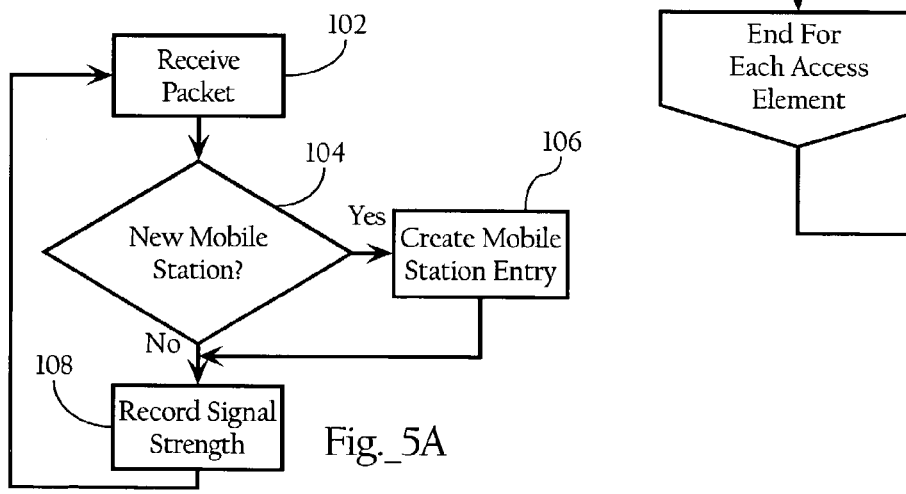
Fig._5A

AUTOMATIC COVERAGE HOLE DETECTION IN COMPUTER NETWORK ENVIRONMENTS

CROSS-REFERENCE TO RELATED APPLICATIONS

This application makes reference to the following commonly owned U.S. patent applications and patents, which are incorporated herein by reference in their entirety for all purposes.

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN."

FIELD OF THE INVENTION

The present invention relates to wireless computer networks and, more particularly, to methods, apparatuses and systems facilitating analysis of coverage associated with wireless computer network deployments.

BACKGROUND OF THE INVENTION

The market adoption of wireless LAN (WLAN) technology has exploded, as users from a wide range of backgrounds and vertical industries have brought this technology into their homes, into their offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, monitoring and management of the components implementing the wireless network environments becomes critical to performance and security. To ascertain the coverage and other performance attributes of a wireless network deployment, prior art processes, such as site surveys, typically involve a human tester roaming throughout the wireless network environment with specialized equipment, such as a WLAN tester, that sweeps the wireless coverage area and stores the resulting data for analysis of one or more attributes of the wireless network deployment, such as the coverage provided by each access point, and the signal-to-noise ratios associated with the coverage area of a given access point. Such site surveys, however, are time consuming and expensive. In addition, the analysis of the wireless network environment is performed with data gathered at a single point in time and, therefore, is not responsive to periodic or subsequent changes associated with the wireless network environment (such as new or intermittent sources of RF interference, etc.). In addition, the test equipment may be located in areas where use of wireless client devices is infrequent or unimportant.

In light of the foregoing, a need in the art exists for methods, apparatuses and systems that facilitate analysis of coverage in wireless network environments. A need further exists for methods, apparatuses and systems that allow for analysis of coverage that is responsive to changing or varying conditions in wireless computer network environments. A need further exists in the art for methods, apparatuses and systems that allow for analysis of coverage in wireless network environments that obviate the need for dedicated test equipment and expensive site surveys. Embodiments of the present invention substantially fulfill these needs.

SUMMARY OF THE INVENTION

The present invention provides methods, apparatuses and systems enabling real-time analysis of coverage and other performance attributes of distributed or networked systems, such as wireless computer network environments. In one embodiment, the present invention utilizes information obtained from monitoring wireless communications in a wireless network system from remote client elements to access elements in relation to at least one attribute, such as signal strength and signal-to-noise ratio (SNR). Although the present invention has application to a variety of wireless network architectures, in one embodiment, the present invention is implemented in a wireless Local Area Network (WLAN) system having a hierarchical architecture comprising a central control element associated with at least one access element. The access element encapsulates data packets received from remote client elements including protocol and other information (such as attributes of the detected signal associated with the data packets), and tunnels the encapsulated data packets to the central control element. The central control element maintains and analyzes the information contained in the packets to determine the coverage of the wireless network environment.

DESCRIPTION OF THE DRAWINGS

FIG. 1 is a block diagram of a wireless local area network system according to the invention.

FIG. 2 is a block diagram of a central control element according to the invention.

FIG. 3 is a representation of a packet of communication between an access element and a central controller during communication between a client remote element and the access element.

FIG. 4 is a functional block diagram illustrating the functional elements associated with the coverage hole detection mechanism according to an embodiment of the present invention and the packet flow across these functional elements.

FIGS. 5A, 5B and 5C are flow charts illustrating methods, according to embodiments of the present invention, directed to the collection and analysis of coverage data.

DESCRIPTION OF PREFERRED EMBODIMENT(S)

A. Operating Environment

Figure 5C:
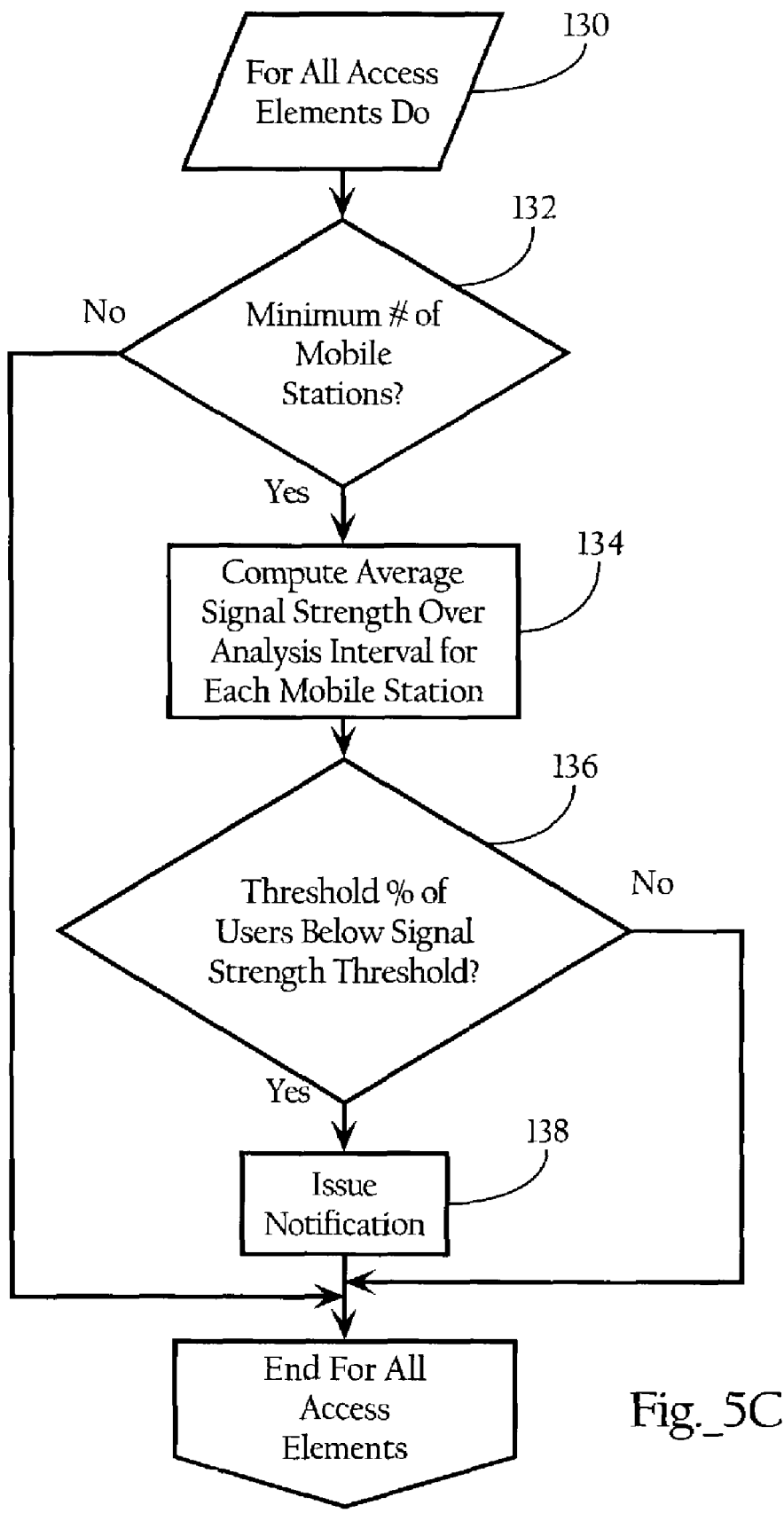

For didactic purposes an embodiment of the present invention is described as operating in a WLAN environment as disclosed in U.S. application Ser. No. 10/155,938 incorporated by reference herein. As discussed below, however, the present invention can be implemented according to a vast array of embodiments, and can be applied to a variety of WLAN architectures.

Referring to FIG. 1, there is shown block diagram of a wireless Local Area Network system 10 according to the invention. A specific embodiment of the invention includes the following elements: access elements 12, 14 for wireless communication with selected client remote elements 16, 18; 20, 22, central control elements 24, 26, and means for communication between the access elements and the central control elements, typically direct line access 28, 30, but potentially a wireless backbone, fiber or other reliable link. The wireless links between access elements 12, 14 and client remote elements 16, 18; 20, 22 are assumed to be less reliable and not always orthogonal to other communications employing the same medium.

The access elements 12, 14 are coupled via communication means using a WLAN protocol (typically IEEE 802.11) to the client remote elements 16, 18; 20, 22. The communications means 28, 30 between the access elements 12, 14 and the central control element 24 is typically an Ethernet network, but it could be anything else which is appropriate to the environment. As implemented by the computer code outlined hereinafter, the central control element 24 provides processing to dynamically configure a wireless Local Area Network of a system according to the invention while the access elements 12, 14 provide the acknowledgement of communications with the client remote elements 16, 18; 20, 22. The central control element 24 may for example process the wireless LAN network management messages, load control, channel control, and handoff. Among the network management messages are authentication requests of the client wireless access elements 12, 14 and association requests of the client wireless access elements 12, 14. The network management messages are passed on from the client remote elements 16, 18; 20, 22 via the access elements 12, 14, such as authentication requests and authorization requests, whereas the access elements 12, 14 provide immediate acknowledgment of the communication of those messages without conventional processing thereof. Similarly, the central control element 24 may for example process physical layer information. Still further, the central control element 24 may for example process information collected at the access elements 12, 14 on channel characteristic, propagation, and interference or noise.

Referring to FIG. 2, the typical central control element 24 comprises a first Ethernet switch 32 with a plurality of Ethernet interfaces 34-37 coupled to the communication media 28-31 to the access elements, such as access elements 12 and 14, a central processor 38 for providing the communication control functions with the control element from the access elements 12, 14 as well as a wider network, such as WAN 50 coupled to a router 52 into a global network 54 (FIG. 1) via a further Ethernet controller 40 (FIG. 2).

The Ethernet controller 40 can be a standalone element, or it could be accessed through the Ethernet switch, depending upon design considerations. The central processor 38 communicates control commands with the Ethernet controller 40 and the Ethernet-coupled communication means 28-31 while allowing data to pass directly between Ethernet connections within the central control element 24.

Referring again to FIG. 1, the typical access element 12 performs the RF conversion and time critical portions of the WLAN access protocol. The WLAN protocol frame is encapsulated in an Ethernet frame with information about the radio environment and signal strength, and then is sent to the central control element 24. Similarly, referring to FIG. 3, the access element 12 receives information via an Ethernet control and information packet 60 having an Ethernet 802.3 header 61 from the central control element 24 to control its operation, including but not limited to, selection of a radio channel for operation (local RF field 62), control of the transmit power of the radio (local RF field 62), and configuration of the WLAN parameters (WLAN field 64) and WLAN protocol frames to be transmitted 66, including Wireless LAN information control (802.11 frame 68) encapsulated with a payload 70.

The central control element 24 receives encapsulated WLAN protocol frames from the access element 12, strips the Ethernet encapsulation 61 from the frame, processes the WLAN protocol frame 66 and the encapsulated information 62, the physical layer information PHY 65 forwarded by the access element 12, and performs the required operations to complete the appropriate protocol operations, e.g., forwarding information to the network to which the WLAN is connected or performing WLAN mobility operations (handoff, channel assignments, prioritizing, etc.) The central control element 24 utilizes the additional information encapsulated in the Ethernet frame with the WLAN protocol frame to perform calculations to monitor the radio environment over all of the access elements 12, 14, connected to that specific central control element 24 and to make decisions based on that information (such as the detection of coverage holes, as discussed below), along with traffic statistics gleaned from the conventional WLAN protocol operation, to optimize and manage the performance of the WLAN module as a system. (Operations of other central control elements 26 are generally not taken into consideration, as that would be beyond the scope of the present invention.) The local WLAN module decisions include assigning radio channels usable under the 802.11 standard to access elements, setting transmit power levels at the access elements, sharing of traffic load among the access elements according to the invention, and reaction to and correction of failures of the access elements or communications means to those access elements.

In addition, the central control element 24 also sends, via the Ethernet interfaces 28-31 802.3-encapsulated WLAN protocol frames 60 to the access elements 12, 14 for further transmission to the remote client access devices 16, 18, 20, 22 as 802.11 WLAN protocol frames via the wireless medium. Similar protocol frames are used to configure and control the operation of the access elements 12, 14.

The following structure is an example of a message exchanged between the access element 12 and central control element 24 using an 802.3-encapsulated protocol frame of FIG. 3:

```
struct {
    WLANCB        wlan_info;
    RFCB          local_rf_info;
}ControlPacket;
struct {
    WLANCB        wlan_info;
    RFCB          local_rf_info;
    RFHDR         user_rf_header;
    WLANHDR       802_11_header;
    char          *user_data;
}DataPacket;
```

As will be noted, some of the fields can be omitted without loss of generalization.

When the central control element 24 communicates with the access elements 12, 14, the software uses an internal control block within the central processor 38 which contains information specific to the addressed access element 12. The internal control block structure contains the following information:

```
        struct {
        int             port_number;
        char            mac_address[6];
        RFStats         rf_stats;
        }AccessElementCB;
```

Thus, the central processor 38 is able to collect and store internally certain statistics associated with the specific access element 12.

In the specific embodiment, there are two main messages exchanged between the central control element 24 and the access elements 12, 14: a data message and a control message. Control messages from the central control element 24 contain local RF information, which when sent to access elements 12, 14 are used to request administrative tasks, such as changing the radio channel, or transmit power. Control messages sent from the access elements 12, 14 are typically used to acknowledge completed requests. Data messages may include local RF information, but they always include PHY 65 and 802.11 wireless LAN protocol headers 68, as well as user data or payload 70. The presence of local RF information 62 in data packets is an optional optimization that reduces the number of packets that would otherwise need to be sent as a separate control message.

The access elements 12, 14 append a header sent back to the central control element 24 which includes local RF information, such as Receive Signal Strength Indication (RSSI), Signal Quality (SQ), Signal-to-Noise Ratio (SNR) and Noise. Finally, when the resulting packet is encapsulated within a wired link layer header (e.g. 802.3), the destination MAC address is set to the address of the central control element 24 with which the access element 12 communicates.

According to the method of the invention, the central control element 24 of a specific embodiment encapsulates a frame within an Ethernet frame, which is then forwarded to the access elements. The following code provides an example of such a process:

```
/*
* ForwardFrameToAccessElement ( )
*
* Input:
*       frame - The frame to forward to the mobile station.
*
* Desc: This function takes a frame, encapsulates it
*       within an Ethernet header, and transmits the
*       frame to the access element responsible for the
*       mobile station.
*/
int ForwardFrameToRadioElement (char *frame) {
AccessElementCB *element;
char *newframe;
/*
* Using the destination link layer address, determine
* the access element the mobile station is currently
* associated with. If the mobile station has not
* associated with the central control element, the function
* will return a NULL; otherwise it will return a pointer to
* an access element control block.
*/
element = FindAccessElementCB(frame);
if (element == NULL) {
/*
* Unable to send packet to access element
* return error
*/
return (-1);
}
/*
* Perform the bridging function by converting the wired
* protocol header to the WLAN protocol header and return
* a pointer to the new frame.
*/
newframe = TranslateToWLANPacket(element, frame);
if (newframe == NULL) {
/* Unable to bridge packet - return error */
return (-1);
}
/*
* If possible, piggy back a control message within
* this packet. The function will return a pointer
* to the new frame.
*/
newframe = AddLocalRFHeader(element, newframe);
if (newframe == NULL) {
/* Unable to append data - return error */
return (-1);
}
/*
* Add the WLAN header to the packet, which
* returns a pointer to the new frame.
*/
newframe = AddWLANHeader(element, newframe);
if (newframe == NULL) {
/* Unable to append data - return error */
return (-1);
}
/*
* Encapsulate the 802.11 frame within an Ethernet
* frame by appending a wired link layer header. The
* function will return a pointer to the new frame.
*/
newframe = EncapsulateOverWire(element, newframe);
if (newframe == NULL) {
/* Unable to encapsulate - return error */
return (-1);
}
/*
* Transmit the frame to the access element
*/
if (SendFrameToAccessElement(element, newframe)) {
/* driver did not send frame */
free(newframe);
return (-1);
}
return (0);
}
```

According to the method of the invention, the central control element of a specific embodiment also receives a frame encapsulated within an Ethernet frame from the access elements. The following code provides an example of such a process:

```
/*
* ProcessFrameFromAccessElement ( )
*
* Input: frame - The frame from the mobile.
*
* Desc: This function takes a frame from an access
*       element, processes the data added by the access
*       element, and transmits the frame towards the
*       network
*/
int ProcessFrameFromAccessElement (char *frame) {
AccessElementCB *element;
char *newframe;
/*
* Use the MAC address within the frame header to
* identify which access element the packet was sent from.
* The function must return an access element control
* block, which contains the information necessary to
* transmit packets to the remote access element.
*/
element = FindAccessElementCB(frame);
if (element == NULL) {
/*
* Unable to find access element
* return error
```

-continued

```
*/
return (−1);
}
/*
* Skip the encapsulating header, and retrieve a
* pointer to the next header.
*/
newframe = SkipEncapsulatingHeader(frame);
if (newframe == NULL) {
/* Unable to skip header */
return (−1);
}
/*
* Process the WLAN header, and return a pointer
* to the next header in the packet.
*/
newframe = ProcessWLANHeader(element, newframe);
if (newframe == NULL) {
/* Unable to append data - return error */
return (−1);
}
/*
* Process the Local RF header, and return a pointer
* to the next header in the packet.
*/
newframe = ProcessLocalRFHeader(element, newframe);
if (newframe == NULL) {
/* Unable to append data - return error */
return (−1);
}
/*
* Perform the necessary 802.11 access control by validating
* that the source of the packet was a mobile station permitted
* to transmit packets from the access element, and that the
* contents of the packet satisfy the policy verifications. If
* permitted, perform the bridging function by translating the
* mobile station's WLAN protocol header to the wired header.
*/
newframe = AuthorizeMobile StationPacket(element, newframe);
if (newframe == NULL) {
/* Unable to encapsulate - return error */
return (−1);
/*
* Transmit the frame onto the backbone network
*/
if (SendFrameToNetwork(newframe)) {
/* driver did not send frame */
free(newframe);
return (−1);
}
return (0);
}
```

In the specific embodiment, routing of the data frames to and from the remote wireless clients through the access element is implemented by the central control element determining which access element is to handle a data frame of a specific remote wireless client, as well as determine the validity of the use of the access element by the remote wireless client, and the routing and destination of the frame from the wireless client.

B. Operation of Auto Coverage Hole Detection

The access elements, such as access elements 12, 14, include functionality allowing for detection of the strength of the signal received from client remote elements. For example, the IEEE 802.11 standard defines a mechanism by which RF energy is to be measured by the circuitry (e.g., chip set) on a wireless network adapter or interface card. The 802.11 protocol specifies an optional parameter, the receive signal strength indicator (RSSI). This parameter is a measure by the PHY layer of the energy observed at the antenna used to receive the current packet. RSSI is measured between the beginning of the start frame delimiter (SFD) and the end of the PLCP header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet transmission can be used in determining the existence of coverage holes in the wireless network environment. Again, many chip sets include functionality and corresponding APIs to allow for a determination of SNRs associated with packets received from client remote elements. In one embodiment, access elements 12, 14 include the detected signal strength and/or SNR value associated with a packet in the physical layer information (PHY) field 56 of the encapsulated 802.11 packet (See FIG. 3).

FIG. 4 is a functional block diagram illustrating the functional elements associated with the coverage analysis and coverage hole detection mechanism according to an embodiment of the present invention. As FIG. 4 illustrates, central control element 24 includes coverage analysis module 80, stats collector 84, database 86 and packet controller 82. Packet flow controller 82 routes the data frames to and from the remote wireless clients through the access elements, and handles other tasks associated with operation of the wireless network environment, such as authentication and association (see above). As discussed more fully below, stats collector 84 maintains one or more statistics characterizing various aspects of the wireless network environment based on an examination of the information contained in the packets traversing central control element 24. Coverage analysis module 80, in one embodiment, is operative to periodically store the statistic(s) maintained by stats collector 84 in database 86 in association with a time stamp. Coverage analysis module 80 is further operative to analyze the data over a configurable time interval to detect a coverage hole associated with a given access element.

FIG. 4 also shows the packet flow path according to an embodiment of the present invention. In one embodiment, stats collector 84 maintains a histogram of signal strength on a per-access-element basis based on the signal strength information (e.g., SNR, RSSI, dBm) contained in the packet headers traversing central control element 24. For example, the received signal strength (dBm) of a packet received by an access element is recorded in a corresponding histogram having a range of −100 dBm to −10 dBm in increments of 1 dB bins. Of course, the exact range and number of bins may depend on the physical properties of the wireless network protocol and are also matters of engineering choice. Accordingly, the exact ranges and number of bins set forth herein are not intended to limit the scope of the claimed invention. As the data structure set forth below indicates, stats collector 84 maintains other statistics associated with the signal strength histogram for each access element, such as number of samples, number of unique MAC addresses, etc. As discussed above, coverage analysis module 80 is operative to store the statistics in association with a time stamp in database 86 and reset the statistic values maintained by stats collector 84.

```
BSNRadioHistFil(x) = . . .
The RSSI histogram struct:
typedef struct {
    int         NumberOfSamples;
    int         Number OfUniqueMACIDs;
    time        TimeOfFirstSample;
    time        TimeOfLastSample;
    int         RadioHistogram[100];
    int         ClientHistogram[100];
}
```

As one skilled in the art will recognize, the received signal strength values maintained by stats collector 84 reflect the strength of the signal transmitted from the remote client element to the access element. The histogram can be shifted by the equation below to obtain an estimate of the signal strength of the access elements 12, 14 relative to the remote client elements:

ClientHistogram(x)=RadioHistogram(x)+RadioEIRP−ClientEIRP), where RadioHistogram(x) is a histogram of signal strength maintained by stats collector 84 for a given access element, RadioEIRP is the transmit power (dBm) of the access element, ClientEIRP is the average transmit power (dBm) of the remote client elements, as detected by the packets traversing central control element 24. In one embodiment, the client transmit power, ClientEIRP, is obtained by scanning the MAC addresses of the remote client elements against a table or other database that contains the transmit powers associated with different wireless adapters by vendor as identified by the first N bits of the MAC address. In another embodiment, stats collector 84 is operative to perform the conversion as part of the statistics collection process. For example, stats collector 84 may be operative to poll the device/transmit power table using the MAC address of the remote client element to determine the ClientEIRP value and then estimate the signal strength of the access element based on the RadioEIRP, ClientEIRP and the received signal strength indicator. To ensure that a single remote client element involved in a large data flow, such as streaming video, is not over represented in the histogram, coverage analysis module 80, in one embodiment, applies a filter to the histogram, RadioHistogram, before estimating the Client Histogram. Of course, other embodiments of the present invention can use the RadioHistogram values, rather than estimating the Client Histogram.

After the client histogram for a given access element is computed, coverage analysis module 80 then determines whether the level of coverage reflected by the histogram meets a minimum coverage profile configured by a network administrator. In one embodiment, the minimum coverage profile specifies what percentage of the histogram samples should be above a specified threshold level (e.g., received signal strength, SNR, etc.). For example, a network administrator may specify that 95% of the estimated client samples should be above −70 dBm.

The analysis described above can be used in a variety of ways. For example, the central control element 24 may be configured to transmit a notification to the network administrator if the minimum coverage profile is violated. In another embodiment, the coverage analysis set forth above may be used to adjust the transmit power of the access element corresponding to the histogram. For example, given the coverage profile provided above, if, for example, 95% of the data points are greater than −65 dBm in the estimated client histogram, the transmit power to the access element can be reduced by 5 dB.

In another embodiment, coverage analysis as to each access element is based on percentage of mobile stations below a threshold signal strength level, as opposed to the sample-based methodology discussed above. Stats collector 84 maintains, for each access element, a list of identifiers (e.g., MAC addresses) of the remote client elements that have established wireless connections. Stats collector 84, as to each mobile station identifier in the list, maintains the detected signal strength values associated with each packet corresponding to the remote client elements. FIG. 5A illustrates a method directed to the collection of signal strength data on a packet-by-packet basis for each mobile station. As FIG. 5A illustrates, stats collector 84, when it receives a data packet (102), determines whether the packet is associated with a new mobile station (104) and, if so, creates a new mobile station entry including the MAC address or other identifier corresponding to the mobile station (106). Stats collector 84 then records the signal strength value contained in the encapsulating packet header in associated with the corresponding mobile station identifier (108). A separate process scans the list of mobile station identifiers and deletes the entries where no activity has been detected after a threshold period of time as to that access element.

As FIG. 5B indicates, stats collector 84 maintains the signal strength values for each packet traversing it for an averaging interval or window, at which point the coverage analysis module 80 polls the stats collector 84 for the collected data and then filters the signal strengths over the averaging interval. In one embodiment, coverage analysis module 80, at a configurable averaging interval or window (e.g., 1 minute, etc.) (112), computes the average signal strength from the values collected during examination of each packet by stats collector 84 (122). In one embodiment, coverage analysis module 80 stores the computed values in a persistent data store in association with a time stamp. As FIG. 5B shows, coverage analysis module 80 performs this computation for each access element (118) and each mobile station (120). In one embodiment, coverage analysis module 80 resets the counts maintained by stats collector 84 as it traverses the mobile stations (124).

As FIG. 5B also shows, stats collector 84, at a configurable analysis interval (e.g., 3 minutes) (114), then analyzes the filtered coverage data (116). FIG. 5C illustrates a method, according to an embodiment of the present invention, directed to the analysis of coverage data. Coverage analysis module 80, as to each access element (130), first determines whether a minimum number of mobile stations have established wireless connections with the access element (132). If so, coverage analysis module 80 computes the average signal strength over the analysis interval for each mobile station (134). If a configurable threshold percentage of mobile stations associated with an average signal strength is less than a threshold level (136), coverage analysis module 80, in one embodiment, issues a notification (138). Of course, other actions are possible, such as setting a flag in a data structure associated with the access element, or invoking a process that increases the transmit power of the access element.

In one embodiment, the notification mechanism implemented by central control element 24 can be configured to issue notifications only in connection with specific access elements or specific users (as identified by MAC address or other identifier for the remote client element associated with a given user). For example, as part of its management interface, central control element 24 may allow the user to turn notifications on or off with respect to specific access elements. In addition, central control element 24 may allow network administrators to add the MAC address of remote client elements to a high profile user list or other data structure. In one embodiment, stats collector 84 may also generate a delimited list of the MAC addresses of the remote client elements, as detected in the packets traversing central control element 24. Assuming a coverage profile violation is detected as to a given access element, central control element 24 compares the delimited list of remote client elements against the high profile user list to determine whether a notification should be issued.

Of course, other embodiments and system architectures are possible. For example, the signal strength histograms can be maintained at access elements 12, 14 and retrieved on a periodic basis by central control element 24 via Simple Network Management Protocols (SNMP) or other query methods. In addition, the connections between central control element 24 and the access elements 12, 14 need not be through direct access lines 28, 30 respectively. A variety of system architectures are possible. For example, central control element 24 and the access elements can communicate over a Local Area Network, or over a VLAN in a Wide Area Network (WAN). In addition, central control element 24 and the access elements associated therewith can be deployed across a Wide Area Network, such as the Internet. Furthermore, in the embodiment described above, central control element 24 bridges the wireless traffic between the remote client elements and network 50. In other embodiments, the access elements 12, 14 bridge the wireless traffic between the remote client elements and network 50. In addition, the present invention can also be applied to WLAN architectures beyond the hierarchical WLAN architecture described above. For example, in another embodiment, the coverage analysis functionality described herein can be implemented within the context of a single, autonomous access point, which can be configured to provide notifications and/or communicate with a central management platform via SNMP or other protocols.

The invention has been explained with reference to specific embodiments. Other embodiments will be evident to those of ordinary skill in the art. It is, therefore, intended that the claims set forth below not be limited to the embodiments described above.

What is claimed is:

1. In a wireless computer network environment comprising at least one wireless access element operative to communicate with at least one wireless client device, a method facilitating analysis of coverage in the wireless computer network environment, comprising
    monitoring, relative to at least one attribute, the signal associated with wireless traffic between at least one wireless client device and at least one wireless access element, wherein monitoring the signal comprises
        receiving, at a wireless access element, data packets from at least one wireless client device; and
        detecting, concurrently with the receiving step, the strength of the signals associated with at least a subset of the data packets;
    maintaining values of the at least one attribute of the signal between the at least one wireless access element and the at least one wireless client device;
    determining a coverage profile for the at least one wireless access element based on the values of the at least one attribute over an analysis interval.

2. The method of claim 1 further comprising
    comparing the coverage profile for the at least one wireless access element to a minimum coverage profile; and
    issuing a notification as to the at least one wireless access element if the coverage profile violates the minimum coverage profile.

3. The method of claim 2 wherein wireless client identifiers are detected in the monitoring step and stored in the maintaining step in association with the corresponding access element, the method further comprising
    maintaining a user list including at least one wireless client device identifier; and wherein the issuing a notification step is further conditioned on if the at least one wireless client identifier associated with the corresponding wireless access element is included in the user list.

4. The method of claim 1 further comprising
    comparing the coverage profile to a minimum coverage profile; and
    adjusting the configuration of the at least one wireless access element based on the results of the comparing step.

5. The method of claim 3 wherein the adjusting step comprises
    lowering the transmit power of the at least one access element if the coverage profile exceeds the minimum coverage profile.

6. The method of claim 1 wherein the determining step comprises
    estimating, for the at least one access element, the received signal strength at a wireless client device associated with the at least one access element based on the signal strength indicators in the maintaining step.

7. The method of claim 1 wherein the maintaining step comprises
    maintaining the values of the at least one attribute of the signal in a histogram for the at least one wireless access element.

8. The method of claim 1 wherein the maintaining step comprises
    maintaining the values of the at least one attribute of the signal in a histogram for the at least one wireless access element.

9. The method of claim 8 wherein the determining step comprises
    filtering the histogram to reduce the impact of one or more wireless client devices associated with a large number of data packets.

10. The method of claim 9 wherein the determining step further comprises
    comparing the filtered histogram to the minimum coverage profile.

11. The method of claim 1 wherein the at least one attribute is signal strength.

12. The method of claim 1 wherein the at least one attribute is signal-to-noise ratio.

13. An apparatus facilitating analysis of coverage in a wireless computer network environment, comprising
    a wireless network interface operative to:
        receive data packets in wireless signals from remote wireless clients;
        detect the strength of the wireless signals associated with the packets;

provide indicators of the strength of the detected wireless signals;

a data collector operative to maintain the indicators of the strength of the wireless signals provided by the wireless network interface in a data structure, and identifications of the remote wireless clients associated with the packets; and a coverage analysis module comprising a user list including identifications of remote wireless clients, and wherein the coverage analysis module is operative to analyze the indicators of the strength of the wireless signals to determine compliance with a minimum coverage profile; and issue a notification if the minimum coverage profile is violated and an identification of the remote wireless client maintained by the data collector matches an identification in the user list.

14. The apparatus of claim 13 wherein the data structure is a histogram.

15. The apparatus of claim 13 further comprising a database, and wherein the coverage analysis module is operative to store the indicators maintained by the data collector in the database in association with a time stamp.

16. A system facilitating analysis of coverage in a wireless computer network environment, comprising a plurality of access elements for wireless communication with at least one remote client element and for communication with a central control element; and a central control element associated with the plurality of access elements;

wherein said access elements are each operative to receive wireless signals transmitting wireless data packets from the at least one remote client element, detect an attribute associated with the wireless signals, associate the attributes with the corresponding data packets, encapsulate the wireless data packets in an encapsulating packet, wherein the encapsulating packet includes the corresponding signal attribute, and transmit the encapsulating packet to the central control element;

wherein the central control element is operative to decapsulate the encapsulating packets and bridge the wireless data packets to appropriate destination nodes, and wherein the central control element comprises a data collector operative to maintain the signal attributes contained in encapsulating packets in a data structure; and a coverage analysis module operative to analyze the signal attributes maintained by the data collector to determine compliance with a minimum coverage profile;

maintain a user list including at least one remote client element identifier;

maintain remote client element identifiers in association with corresponding access elements; and issue a notification as to an access element if the access element does not comply with the minimum coverage profile and at least one wireless client identifier associated with the access element is included in the user list.

17. The system of claim 16 wherein the signal attribute is signal strength.

18. The system of claim 16 wherein the signal attribute is signal-to-noise ratio.

* * * * *